United States Patent [19]

Smith

[11] 4,083,359
[45] Apr. 11, 1978

[54] SOLAR HEATER UNITS

[76] Inventor: Frederick A. Smith, 807-1246 Haro St., Vancouver, British Columbia, Canada, V6E 1E7

[21] Appl. No.: 705,531

[22] Filed: Jul. 15, 1976

[51] Int. Cl.² ............................................. F24J 3/02
[52] U.S. Cl. ................................. 126/271; 237/1 A
[58] Field of Search ................ 126/270, 271; 237/1 A

[56] References Cited

U.S. PATENT DOCUMENTS

| | | | |
|---|---|---|---|
| 3,390,672 | 7/1968 | Snelling | 126/271 |
| 3,915,147 | 10/1975 | Rineer | 126/271 |
| 4,003,367 | 1/1977 | Wikholm | 126/271 |

*Primary Examiner*—Kenneth W. Sprague
*Attorney, Agent, or Firm*—Larson, Taylor and Hinds

[57] ABSTRACT

A shallow tank which is inclined when the unit is in operative position and having a relatively large surface to face in the direction of the sun, and a wide tube or a plurality of tubes extending over this large surface and communicating at one end directly with the interior of the tank near the lower end thereof and communicating at an opposite end directly with the interior of the tank spaced above its lower end, thermosiphon circulation being maintained as liquid in the unit is heated by the sun when in the tube or tubes and flows therefrom into the tank, down through the tank and back into the tube or tubes. It is preferable to provide an insulation shield over the end of each tube which directs liquid into the tank.

20 Claims, 11 Drawing Figures

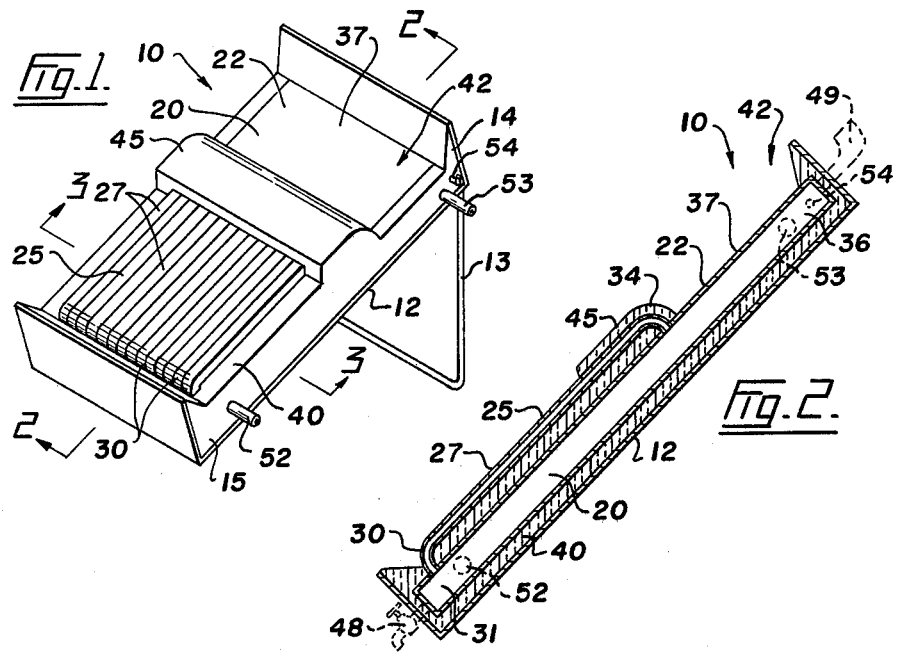
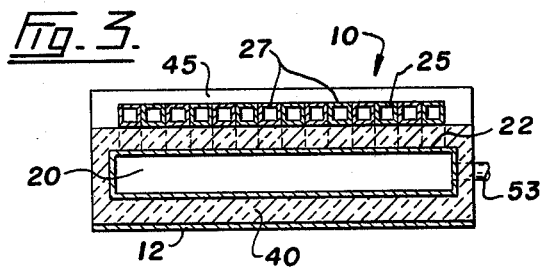
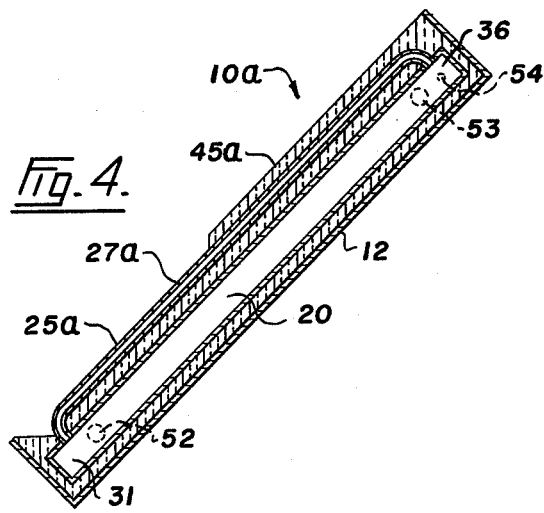

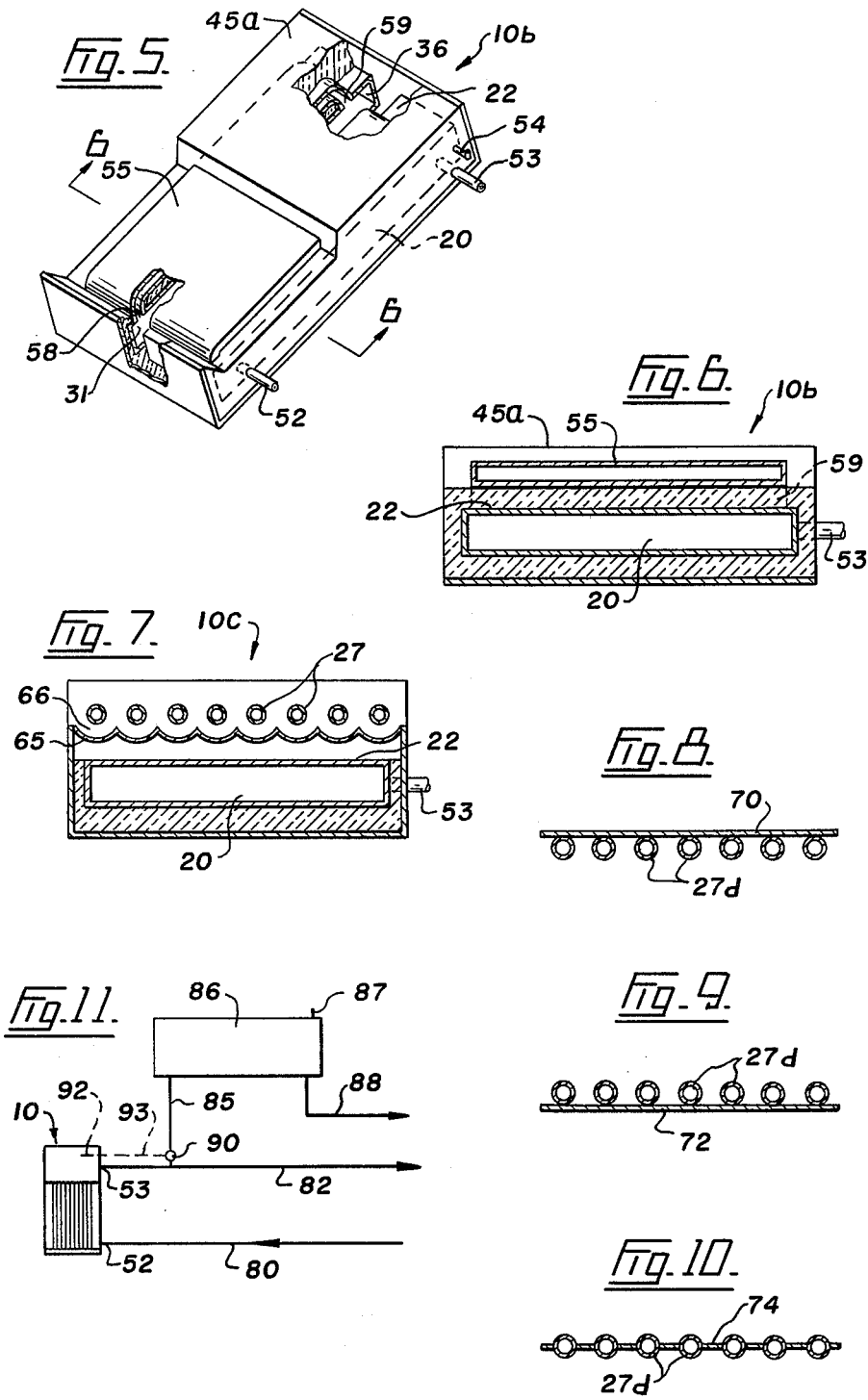

SOLAR HEATER UNITS

This invention relates to solar heater units for heating liquids such as water.

There are a number of solar heaters in the prior art such as, for example, those illustrated and described in U.S. Pat. No. 2,122,821 dated July 5, 1938 and U.S. Pat. No. 2,705,948 dated Apr. 12, 1955. To be satisfactory, solar heaters must heat the water rapidly and be able constantly to maintain a fairly large volume of hot water for immediate use. Most of the heaters of the prior art are rather cumbersome and slow acting.

The solar heater of U.S. Pat. No. 2,122,821 has a plurality of relatively large tubes extending between a small lower header and a large upper header. The lower header has upper and lower openings aligned with each tube, while the upper header also has upper and lower openings aligned with the tube. The upper surfaces of the tubes are exposed to the sun, but these tubes are of such large cross sectional area that only a relatively small quantity of the water in the tubes is near the tube surface exposed to the sun. The water in the upper portions of the tubes is heated by solar radiation and travels upwardly into the upper header, while comparatively cooler water travels downwardly along the lower surfaces of these tubes to the lower header. Thus water in each tube is moving in opposite directions along the upper and lower surfaces. Not only is a small proportion of the water exposed to the solar radiation, but the counterflow idea makes for relatively slow movement of the water in the tube.

U.S. Pat. No. 2,705,948 discloses a solar heater having a plurality of spaced tubes extending substantially horizontally between two vertical headers, these tubes being slightly inclined upwardly. Although the tubes are relatively small in diameter, there is no water being heated in the spaces between these tubes, and all of the water heated in the tubes enters one of the vertical headers in order to flow upwardly into a tube extending into the upper end of an insulated tank which is spaced below and overlaps said inclined tubes. The downward flow of the water is in this tank, and all of the water which is to enter the tube grid has to go through a single pipe to the lower end of the other of the headers. Regardless of the size of the grid, the fluid flow is controlled by the single pipe directing the hot water into the top of the tank and the single pipe directing cooler water out of the bottom of the tank.

The solar heater of the present invention is very neat in construction, and designed so that a very large percentage of the water in the heating section thereof, which consists of one or more tubes, is exposed to solar radiation. A large volume of water in comparison to the size of the total unit is exposed to this radiation and the water flows directly from each tube into a tank which is positioned beneath and in overlapping relationship with the heating section, and flows directly from the lower end of this tank into each tube. Although there may be a plurality of heating tubes in the heating section, there may be only one relatively wide tube or duct communicating at opposite ends directly with the interior of the tank. In addition, the tank is preferably made relatively high with respect to the effective height of the tube or tubes in the heating section. With these arrangements, there is a rapid circulation of the water through the unit so that as the unit is exposed to sun the water is heated very rapidly and maintained at its upper heated level. The rapid circulation is the result of a good thermosiphon system maintained by sufficient gravity as well as a density gradient.

This unit is such that it can be portable so as to be moved into different positions to expose the tube arrangement thereof directly to the sun. The unit can be completely self-contained so that it can be moved from place to place in order to provide hot water at these places. With a completely self-contained unit, water can be withdrawn therefrom into containers, but it will be necessary manually to provide additional water to the unit from time to time. On the other hand, the unit can be connected into a pipe system so that when hot water is withdrawn therefrom, cold water automatically enters the unit. The unit can be connected to a reserve tank through a temperature control valve.

A solar heater unit in accordance with this invention comprises a shallow tank having a relatively large surface to face in the direction of the sun when the heater unit is in operative position, said tank when in the operative position having a lower end positioned below the level of an upper end thereof, tube means extending over said large surface and communicating at one end directly with the interior of the tank near said lower end and communicating at an opposite end directly with the interior of the tank spaced above said lower end, whereby thermosiphon circulation is maintained as liquid in the unit is heated by the sun when in the tube means and flows from said opposite end of the tube means into the tank, down through said tank and through said one end back into the tube means.

The tube means can be in the form of a relatively wide and shallow tube or duct, or it can be in the form of a plurality of tubes. In a preferred form of the invention, an insulation shield is provided over the tube means where the latter communicates at its upper end with the tank in order to shield said upper end from the sun.

Examples of this invention are illustrated in the accompanying drawings, in which:

FIG. 1 is a perspective view of a preferred form of solar heater unit,

FIG. 2 is a longitudinal section taken on the line 2—2 of FIG. 1,

FIG. 3 is an enlarged cross section taken on the line 3—3 of FIG. 1,

FIG. 4 is a view similar to FIG. 2 through an alternative form of solar heater unit, FIG. 5 is a perspective view of another alternative form of heater unit, FIG. 6 is a cross section taken on the line 6—6 of FIG. 5, FIG. 7 is a cross section through yet another alternative form of heater unit, FIGS. 8, 9 and 10 diagrammatically illustrate three different tube arrangements for these solar heater units, and FIG. 11 diagrammatically illustrates a solar heater unit of this invention connected to a hot water reserve tank.

Referring to FIGS. 1 to 3 of the drawings, 10 is a solar heater unit in accordance with this invention made up of a base 12 having legs 13 connected thereto at its upper end 14 so that when the lower end 15 of this base rests on a suitable support, legs 13 retain the base in an inclined position. When in use, unit 10 is preferably inclined as shown, although it may be positioned anywhere from the vertical to near the horizontal.

Unit 10 also includes a shallow tank 20 having a surface 22 which faces in the direction of the sun when the heater unit is in operation. Tank 20 is preferably rectangular in shape, and it may be of any desired size, provided it is shallow relative to its length and width. For example, a tank about 125cms long, 60cms wide and 4cms deep has been found to be a practical and useful size.

A heating section 25 in unit 10 is made up of a plurality of tubes 27 overlying the surface 22 of tank 20 and extending longitudinally thereof. These tubes may be of circular cross section, but it is preferable that they have a rectangular cross section as shown in FIG. 3. Although the illustrated tubes are placed side by side, they can be spaced laterally a little as illustrated in FIGS. 7, 8, 9 and 10. Each tube 27 has a lower end 30 which communicates directly with tank 20 near its lower end 31, and an upper end 34 which communicates directly with the interior of the tank spaced upwardly from its lower end 31. In this example, the ends 34 of the tubes are spaced downwardly from the upper end 36 of the tank to leave the upper portion 37 of tank surface 22 exposed.

If desired, all or the main portion of tank 20 may be encased in an insulation jacket 40, as clearly shown in FIG. 2. In this example, jacket 40 is provided with a relatively large opening 42 in its upper surface so that the portion 37 of the tank surface 22 is exposed to the sun just as said tubes are.

Although not absolutely necessary, it is preferable to provide an insulation shield 45 over the upper portions of tubes 27 where they communicate with the interior of the tank so as to shield these upper portions or ends from the sun.

If unit 10 is to be a portable unit, it is provided with a spigot 48 extending from the lower end of tank 20 and a filler tube 49 communicating with the upper end of the tank, this spigot and the filler tube being shown in broken lines in FIG. 2. When the unit is to be connected into a water system, an inlet tube 52 communicates with the lower end and an outlet tube 53 communicates with the upper end of the tank. Tube 52 is to be connected to a cold water pipe of the system, while tube 53 is to be connected to a hot water pipe thereof. In some cases it is desirable to provide a pressure relief valve 54 communicating with the upper end of tank 20.

When solar heater unit 10 is in operation, it is mounted in an inclined position where it faces the sun. If desired, mirrors or reflectors may be provided for directing sun rays onto the unit. In any case, the tubes 27 of heating section 25 are exposed to the sun, excepting the portions thereof beneath shield 45 when the latter is used. In this example, the upper portion 37 of tank 20 also is exposed to the sun. The insulation shield 45 protects the upper ends of the tubes from the sun so that the temperature of the water in these upper ends starts to drop relative to that of the water in the portions of the tubes exposed to the sun. The temperature difference between the water in said tube upper ends and in tank 20 and the water in the exposed tube portion is the temperature differential that causes the thermosiphon circulation of the water in the unit. As tubes 27 are relatively small in cross section, a very large percentage of the water flowing therethrough is close to the surfaces of the tubes directly exposed to the solar radiation. In effect, the sun heats the upper surfaces of the tubes, which act as a flat plate collector, while the water flowing through the tubes continuously absorbs and removes this heat. As the water enters directly into tank 20 from the upper ends of the tubes, and flows directly from the lower end of the tank into the lower ends of these tubes, there are no restrictions in the liquid flow so that a good circulation is maintained at all times when the unit is in operation. The use of tubes of rectangular cross section enables the tubes to be placed close together so as to provide the largest possible tube surface or flat plate collector for exposure to the rays of the sun. The tubes 27 preferably cover the tank substantially throughout the entire width thereof so that the space occupied by the heater unit is utilized to the fullest extent to absorb heat from the sun. As explained above, the insulation shield 45 assists the thermosiphon circulation, while the upper portion 37 of the tank represents an extension of the tank above the upper ends of the tubes in order to increase the head in the tank which, in turn, increases the rate of flow of the water in the unit as a result of the action of gravity. This upper portion 37 is preferably exposed to the sun as described in order to act as an additional heat absorber. The upper surface of portion 37 acts as another flat plate collector.

FIG. 4 illustrates an alternative solar heater unit 10a. This unit is quite similar to unit 10, excepting that the tubes 27a extend from the lower end 31 of tank 20 right up to the upper end 36 thereof. In this example, the insulation shield 45a covers the upper portions of these tubes and the upper portion of the tank. The portion of tubes 27a between the lower end of shield 45a and the lower end 31 of the tank constitute the heating section 25a of this unit.

Unit 10a functions in the same way as unit 10, but the former has less surface area exposed to solar radiation because the upper portion of the tank is covered by shield 45a.

FIGS. 5 and 6 illustrate still another alternative solar heater unit 10b. This unit is similar to unit 10a, but it can also be made similar to unit 10. The only difference between the other units and unit 10b is that the latter has a single relatively wide and shallow tube or duct 55 in place of tubes 27 or 27a. Tube or duct 55 overlies the surface 22 of tank 20 and extends from the lower end 31 thereof to its upper end 36. Tube 55 is about the same width as tank 20 and is very shallow, the depth of this tube being substantially the same as the depth of tubes 27 and 27a. Shield 45a covers the upper end of tube 55.

Tube 55 communicates directly at its lower end with the lower end of tank 20 through one or more openings 58, while the upper end of tube 55 communicates with the tank through one or more openings 59. If there is only one opening 58 or 59, it is preferably in the form of a slot extending transversely of tube or duct 55.

Solar unit 10b functions in the same manner as the units described above. The upper surface of tube 55 acts as a flat plate collector, heat from which is absorbed by the water in said tube.

FIG. 7 illustrates yet another alternative solar heater unit 10c. In this unit tubes 27 are laterally spaced apart and the layer of insulation between tank 20 and the tubes has been omitted. A sheet 65 having curved corrugations or valleys 66 is interposed between the tubes and the tank, said sheet being formed of aluminum or other suitable material and preferably having a reflective surface facing the tubes. This sheet is preferably formed of good heat-absorbing material. The tubes 27 are preferably mounted at the focal points of the corrugations 66 of sheet 65.

The sun rays fall directly on tubes 27 and on corrugated sheet 65. The rays reaching the corrugated sheet are reflected back to said tubes. This sheet absorbs heat from the rays and radiates heat to tank 20.

FIGS. 8, 9 and 10 diagrammatically illustrate a tube arrangement that can be used in either unit 10 or 10a. Tubes 27d can be of circular cross section, as shown, or they can be square or any other shape in section.

In FIG. 8, a flat heat-absorbing sheet 70 formed of copper or other suitable material is placed over spaced tubes 27d and secured thereto in any desired manner, such as by soldering or welding. This sheet preferably covers the heating section 25 of the unit and acts as a flat plate collector and transmits heat to the tubes.

In FIG. 9, a flat sheet 72, similar to sheet 70, is placed under spaced tubes 27d and secured thereto by soldering, welding or the like. This sheet also acts as a flat plate collector and transmits heat to the tubes.

In FIG. 10, a narrow flat heat-absorbing sheet 74 is located between each tube 27d and each adjacent tube and is connected thereto substantially midway between their outer and inner surfaces by welding, soldering or the like. These sheets transmit heat to the tubes. The sheets 74 constitute an interrupted flat plate collector.

FIG. 11 diagrammatically illustrates one of the above-described solar heater units, for example, unit 10, connected to a water system. A cold water pipe 80 is connected to inlet tube 52 while a hot water pipe 82 is connected to the outlet 53. Pipe 80 extends from a cold water source, while pipe 82 extends to the system requiring hot water.

Another pipe 85 extends from hot water pipe 82 to an insulatd reserve tank 86 having an air outlet 87. A hot water pipe 88 extends from tank 86 to the system requiring hot water. A temperature controlled valve 90 is connected in pipe 85. This valve 90 may be a self-acting temperature control valve which is now on the market and which does not require external power, such as air or electricity. On the other hand, the valve may be a standard electrically controlled valve, in which case a heat-sensitive control unit 92 is located within the top area of tank 20 of unit 10 and is electrically connected to the valve, as indicated at 93. The pressure release valve 54 is not required with this arrangement.

In the system of FIG. 11, solar heater unit 10 operates in the manner described above. When the temperature of the water in tank 20 reaches a predetermined level, valve 90 is operated to permit hot water to be directed through pipe 85 into reserve tank 86, from which it may be drawn off through pipe 88. When the temperature of the water in tank 20 drops to a predetermined level, valve 90 closes line 85, the heater unit continuing to function to heat the new water which has been directed therein through pipe 80. Thus, this control arrangement protects unit 10 from excessive pressures, and hot water is stored in tank 86 for use.

I claim:

1. A solar heater unit for liquids, comprising a shallow tank having a relatively large surface in longitudinal and transverse directions to face in the direction of the sun when the heater unit is in operative position, said tank when in the operative position having a lower end positioned below the level of an upper end thereof, tube means of thin cross section outside and overlying the tank and extending over said large surface to form a heating section for said unit, said tube means extending transversely over substantially the full width of said tank surface and having one end communicating directly with the interior of the tank near the lower end thereof, and an opposite end communicating directly with the interior of the tank spaced above said lower end, said one end and said opposite end of the tube means communicating with the tank interior across substantially the full width of the tank, whereby rapid thermosiphon circulation is maintained as liquid in the unit is heated by the sun when in the tube means and flows from said opposite end of the tube means into the tank, down through said tank and through said one end back into the tube means.

2. A heater unit as claimed in claim 1 in which said tube means comprises a plurality of tubes each opening at opposite ends thereof directly into the tank.

3. A heater unit as claimed in claim 2 in which said tubes extend side by side over the tank.

4. A heater unit as claimed in claim 2 in which said tubes are of relatively small cross section.

5. A heater unit as claimed in claim 2 in which said tubes are of relatively small and rectangular cross section.

6. A heater unit as claimed in claim 5 in which said tubes cover said tank surface.

7. A heater unit as claimed in claim 1 in which said opposite end of said tube means communicates with the interior of the tank at an upper end thereof.

8. A heater unit as claimed in claim 1 in which said opposite end of said tube means communicates with the interior of the tank in an area spaced from an upper end of the tank.

9. A heater unit as claimed in claim 1 comprising an insulation shield over said tube means at said opposite end thereof to shield said opposite end from the sun.

10. A heater unit as claimed in claim 2 comprising an insulation shield over said tubes at said opposite ends thereof to shield said opposite ends from the sun.

11. A heater as claimed in claim 1 including liquid inlet means in the tank near the lower end thereof, and liquid outlet means in the tank near the upper end thereof.

12. A heater as claimed in claim 2 including liquid inlet means in the tank near the lower end thereof, and liquid outlet means in the tank near the upper end thereof.

13. A heater as claimed in claim 2 comprising a heat-absorbing sheet extending substantially throughout said heating section and in contact with said tubes.

14. A heater as claimed in claim 13 in which said heat-absorbing sheet is secured to outer surfaces of the tubes.

15. A heater as claimed in claim 13 in which said heat-absorbing sheet is secured to inner surfaces of said tubes.

16. A heater as claimed in claim 13 in which said tubes are laterally spaced apart and said heat-absorbing sheet comprises narrow sheets between the tubes and secured thereto midway between outer and inner surfaces thereof.

17. A heater as claimed in claim 2 comprising a reflective sheet having curved corrugations and positioned between the tubes and the tank, each tube being positioned at a focal point of a curved corrugation of said sheet.

18. A heater unit as claimed in claim 7 comprising an insulation shield over said tube means at said opposite end thereof to shield said opposite end from the sun.

19. A heater unit as claimed in claim 8 comprising an insulation shield over said tube means at said opposite end thereof to shield said opposite end from the sun.

20. A heater unit as claimed in claim 19 comprising an insulation shield over said tube means at said opposite end thereof to shield said opposite end from the sun, said tank surface between the insulation shield over said opposite end of the tube means and said upper end of the tank being exposed to the sun.

* * * * *